US010979502B2

(12) United States Patent
Wang et al.

(10) Patent No.: US 10,979,502 B2
(45) Date of Patent: Apr. 13, 2021

(54) METHOD, DEVICE AND COMPUTER PROGRAM PRODUCT FOR PARALLEL MIGRATION OF DATA

(71) Applicant: EMC IP Holding Company LLC, Hopkinton, MA (US)

(72) Inventors: Yi Wang, Chengdu (CN); Xinwang Zhang, Shanghai (CN); Lili Lin, Chengdu (CN); Qingxiao Zheng, Chengdu (CN); Yang Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 16/117,622

(22) Filed: Aug. 30, 2018

(65) Prior Publication Data
US 2019/0327302 A1    Oct. 24, 2019

(30) Foreign Application Priority Data

Apr. 20, 2018  (CN) .......................... 201810359170.7

(51) Int. Cl.
| | |
|---|---|
| *G06F 15/16* | (2006.01) |
| *H04L 29/08* | (2006.01) |
| *G06F 9/52* | (2006.01) |
| *H04L 29/06* | (2006.01) |
| *G06F 16/11* | (2019.01) |
| *G06F 16/172* | (2019.01) |

(52) U.S. Cl.
CPC ............ *H04L 67/1097* (2013.01); *G06F 9/52* (2013.01); *G06F 16/119* (2019.01); *G06F 16/172* (2019.01); *H04L 67/06* (2013.01); *H04L 67/1095* (2013.01); *H04L 67/2857* (2013.01); *H04L 67/42* (2013.01)

(58) Field of Classification Search
CPC . H04L 67/1097; H04L 67/42; H04L 67/2857; H04L 67/06; H04L 67/1095; H04L 67/34; G06F 16/119; G06F 16/172; G06F 9/52; G06F 11/1458; G06F 11/1448; G06F 11/1453; G06F 16/1748; G06F 3/0647; G06F 16/27
USPC ................ 709/203, 217, 219, 224, 231, 238
See application file for complete search history.

(56) References Cited

U.S. PATENT DOCUMENTS

| | | | | |
|---|---|---|---|---|
| 9,509,612 | B1* | 11/2016 | Armorer | ................. H04L 47/12 |
| 2013/0054524 | A1* | 2/2013 | Anglin | .................... G06F 16/27 |
| | | | | 707/624 |
| 2015/0324255 | A1* | 11/2015 | Kochunni | ............... G06F 3/065 |
| | | | | 711/162 |

(Continued)

*Primary Examiner* — Johnny B Aguiar
(74) *Attorney, Agent, or Firm* — Chamberlain, Hrdlicka, White, Williams & Aughtry

(57) ABSTRACT

Embodiments of the present disclosure provide a method, device and computer program product for migrating data. The method comprises initiating a first migration job for a first client and a second migration job for a second client. The method also comprises setting a first cache file for the first client and a second cache file for the second client, and a cache file records a hash value of a migrated file of a client. Moreover, the method further comprises executing the first migration job and the second migration job in parallel, wherein the first migration job is executed using the first cache file and the second migration job is executed using the second cache file.

15 Claims, 4 Drawing Sheets

(56) References Cited

U.S. PATENT DOCUMENTS

| | | | | |
|---|---|---|---|---|
| 2016/0011945 A1* | 1/2016 | Upadhyay | ........... | G06F 11/1453 707/654 |
| 2016/0026701 A1* | 1/2016 | Smith | ..................... | G06F 16/27 707/618 |
| 2016/0253339 A1* | 9/2016 | Ambrose | .............. | G06F 3/0608 707/693 |
| 2016/0378614 A1* | 12/2016 | Thanasekaran | ..... | G06F 11/1464 707/652 |

* cited by examiner

METHOD, DEVICE AND COMPUTER PROGRAM PRODUCT FOR PARALLEL MIGRATION OF DATA

FIELD

Embodiments of the present disclosure generally relate to data storage and backup, and more specifically, to a method, device and computer program product for migrating data.

BACKGROUND

Data backup refers to backing up data to other storage(s). When data fails or a disaster occurs, the data can be recovered through backup, so as to avoid unnecessary loss. Types of data backup typically include a full backup, an incremental backup, a differential backup and a selective backup. Data backup may be further classified into hot backup and cold backup based on whether or not the system is in a normal operating state.

The data backup procedure may involve some technologies, such as data compression, data encryption, deduplication and the like. The security of the backup system may be increased by encrypting the backup data. Generally, quick and efficient backup and recovery may be realized by reducing the amount of backup data and improving the data transmission rate. Data migration refers to migrating data among different storage systems or servers. For example, data can be migrated from an old backup system or server to a new backup system or server during an upgrade of the backup system.

SUMMARY

Embodiments of the present disclosure provide a method, device and computer program product for migrating data.

In general, in one aspect, the present disclosure provides a method for migrating data. The method comprises initiating a first migration job for a first client and a second migration job for a second client. The method comprises setting a first cache file for the first client and a second cache file for the second client, and the first cache file records a hash value of a migrated file of the first client and the second cache file records a hash value of a migrated file of the second client. The method further comprises executing the first migration job and the second migration job in parallel, and the execution of the first migration job uses the first cache file and the execution of the second migration job uses the second cache file.

In general, in one aspect, the present disclosure provides a device for migrating data. The device comprises a processing unit and a memory coupled to the processing unit and stored with instructions. The instructions, when executed by the processing unit, perform a method, the method includes: initiating a first migration job for a first client and a second migration job for a second client; setting a first cache file for the first client and a second cache file for the second client, wherein the first cache file records a hash value of a migrated file of the first client and the second cache file records a hash value of a migrated file of the second client; and executing the first migration job and the second migration job in parallel, wherein the execution of the first migration job uses the first cache file and the execution of the second migration job uses the second cache file.

In general, in one aspect, the present disclosure provides a computer program product. The computer program product is tangibly stored on a non-transient computer-readable medium and includes computer-executable instructions. The computer-executable instructions, when executed, cause a computer to perform the method or process according to embodiments of the present disclosure.

The Summary is to introduce a selection of concepts in a simplified form that are further described below in the Detailed Description. This Summary is not intended to identify key features or essential features of the present disclosure, nor is it intended to be used to limit the scope of various embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same element in the example embodiments of the present disclosure.

DETAILED DESCRIPTION OF EMBODIMENTS

The preferred embodiments of the present disclosure will be described in more details with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless the context clearly indicates otherwise.

Figure 1:
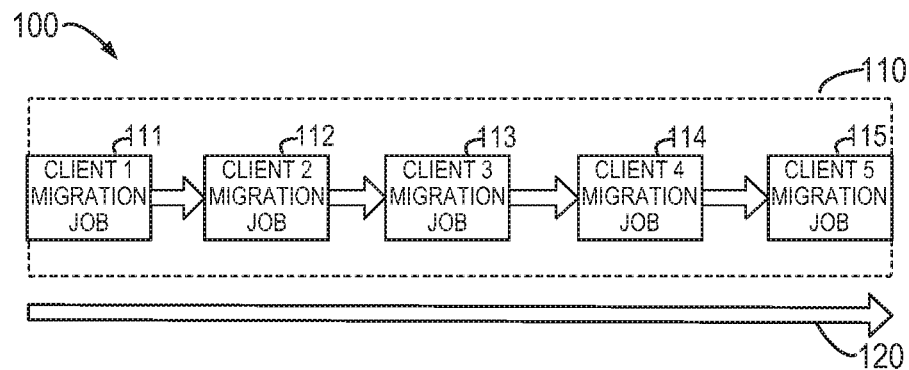
FIG. 1 illustrates a schematic diagram of a traditional data migration method in a backup system.

Traditionally, data is usually migrated from a source server to a target server in a serial manner during an upgrade of a backup system. For example, FIG. 1 illustrates a schematic diagram 100 of a traditional data migration method in the backup system. In the backup system, a plurality of clients are connected to the backup server. For example, when it is required that the data is migrated for five clients, the whole migration job 110 is executed in a serial manner, which includes a migration job 111 for client 1, a migration job 112 for client 2, a migration job 113 for client 3, a migration job 114 for client 4 and a migration job 115 for client 5. Accordingly, a migration tool can only migrate data for one client at one time. When migration of the data of the client is completed, data of next client will be migrated. Further, under the traditional data migration method, only one cache file is needed, because only the data of one client is migrated at a time.

As indicated by arrow 120, it takes a long time to migrate the data because each migration sub job is executed in a serial (or sequential manner), which causes a low efficiency of data migration. In addition, the traditional data migration method is a single job. If the migration job of one client fails, the entire migration process will be suspended. Thus, the traditional migration method is inefficient and is not fault tolerance (or has limited fault tolerance).

Embodiments of the present disclosure provide a solution for executing parallel data migration in a backup system. Embodiments of the present disclosure execute a plurality of migration jobs in parallel using a separate cache file for each client. Compared with the situation with only one cache file (which may cause incorrect deduplication as one client may find a file belonging to another client), a plurality of cache files can ensure independent deduplication during parallel execution of migration jobs. Accordingly, embodiments of the present disclosure migrate the data in parallel for a plurality of clients in the backup system, using a plurality of cache files for the plurality of clients, thereby improving data migration speed and providing better fault tolerance.

Basic principles and several example implementations of the present disclosure are explained below with reference to FIGS. 2 to 9. It should be understood that the example embodiments are provided merely for those skilled in the art to better understand and further implement embodiments of the present disclosure and do not restrict the scope of the present disclosure in any manner.

Figure 2:
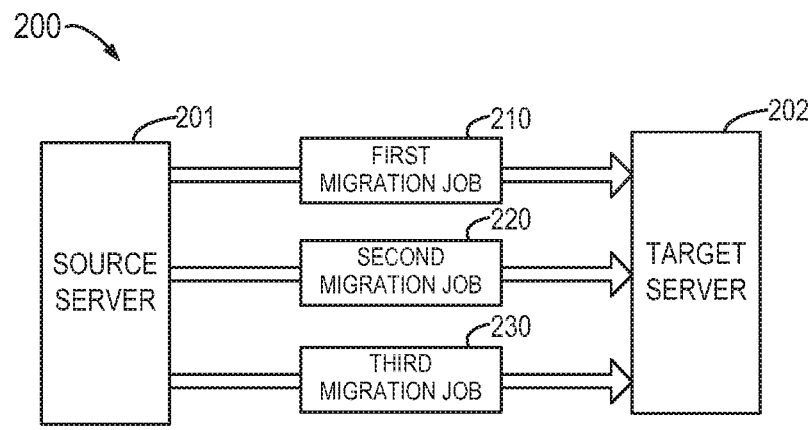
FIG. 2 illustrates a schematic diagram of a backup environment for migrating data according to embodiments of the present disclosure.

FIG. 2 illustrates a schematic diagram of a backup environment 200 for migrating data according to embodiments of the present disclosure. As shown in FIG. 2, the backup environment 200 includes a source server 201 and a target server 202. The backup system executes a plurality of migration jobs in parallel, and the migration jobs include a first migration job 210 for a first client, a second migration job 220 for a second client and a third migration job 230 for a third client. For example, a respective cache file is set for each client, and the corresponding migration job is executed individually based on each cache file. The cache file is used to indicate whether the file has been migrated. This information may be used for data deduplication.

According to embodiments of the present disclosure, a plurality of migration jobs, which are executed in parallel, are initiated during parallel data migration, wherein each client is associated with its own migration job. Moreover, in order to execute the migration jobs independently, it is required that a respectively cache file is set for each client. In some embodiments, progress status of each migration job may be monitored during migration.

Figure 3:
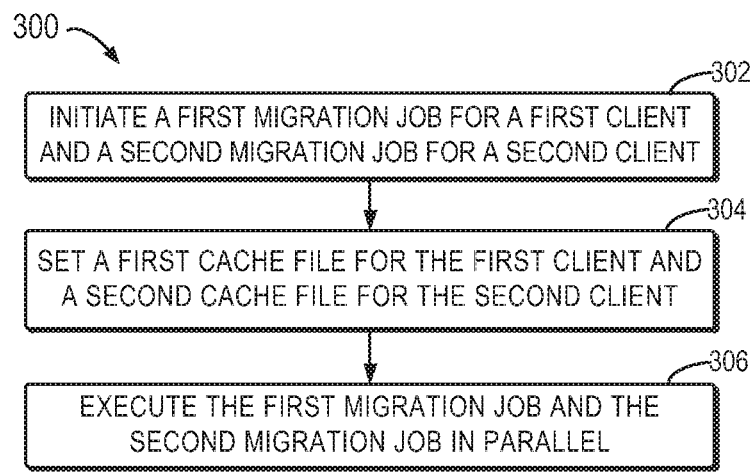
FIG. 3 illustrates a flowchart of a method for migrating data according to embodiments of the present disclosure.

FIG. 3 illustrates a flowchart of a method 300 for migrating data according to embodiments of the present disclosure. It should be understood that the method 300 may be executed by a processor of the backup system. At 302, a first migration job for a first client and a second migration job for a second client are initiated. For example, the first migration job 210 and the second migration job 220 are simultaneously initiated in the backup system, as shown in FIG. 2.

At 304, a first cache file for the first client and a second cache file for the second client are configured. The first cache file records a hash value of a migrated file of the first client, and the second cache file records a hash value of a migrated file of the second client. For example, the cache file may indicate a file that has been transmitted for each client so as to implement data deduplication. It should be appreciated that the file, for example, may be an encrypted and compressed data block, and the migrated data block will not be repeatedly moved or backed up. In some embodiments, a file name of the cache file may be identical to a name of the client.

At 306, the first migration job and the second migration job are executed in parallel. The first cache file is used for executing the first migration job, and the second cache file is used for executing the second migration job. The use of the cache file ensures that data deduplication is achieved for each client. An example implementation of executing a migration job based on a cache file is described below with reference to FIG. 4. Therefore, embodiments of the present disclosure migrate data for a plurality of clients in parallel in the backup system, which can improve data migration speed and provide better fault tolerance.

Figure 4:
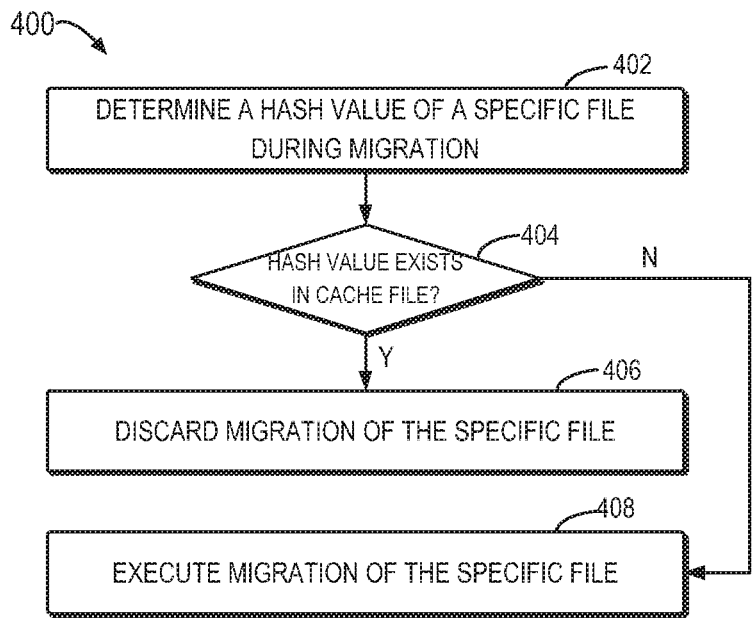
FIG. 4 illustrates a flowchart of a method for executing data migration based on a cache file according to embodiments of the present disclosure.

FIG. 4 illustrates a flowchart of a method 400 for executing data migration based on the cache file according to embodiments of the present disclosure. It should be understood that the method 400 can be an example implementation of action 306 as described with reference to FIG. 3. At 402, a hash value of a specific file to be migrated is determined in a migration job for a certain client. At 404, it is determined whether the hash value of the file has already existed in the cache file corresponding to the client. If the hash value exists in the cache file, it means that the file has been transmitted previously. Thus, repeated migration of the file is discarded at 406 for the sake of data deduplication and reduced data amount. If the hash value does not exist in the cache file, it means that the file has not yet been transmitted, and the migration of the file is executed at 408.

Figure 5:
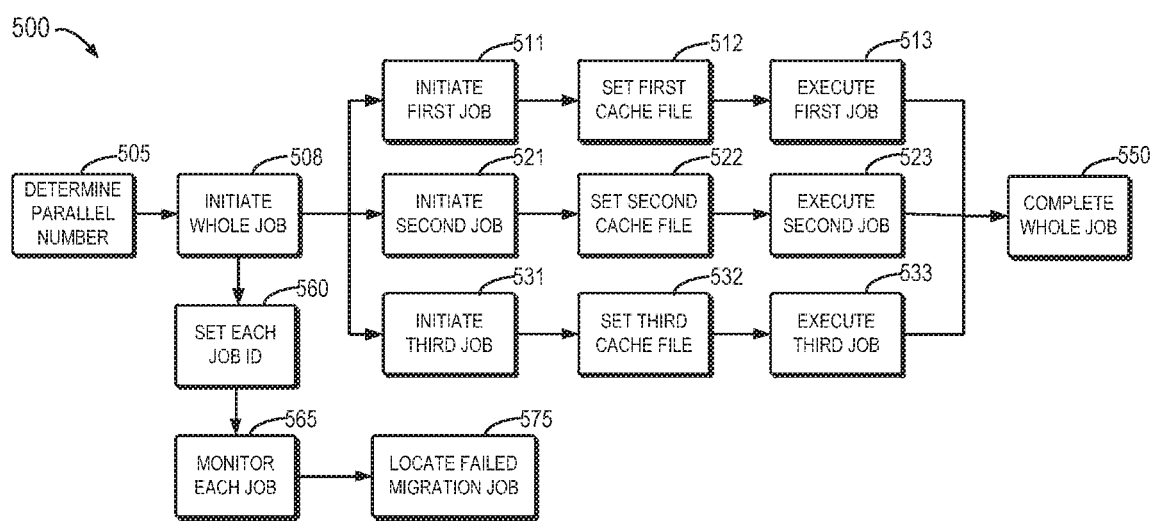
FIG. 5 illustrates a schematic diagram for migrating the data in parallel according to embodiments of the present disclosure.

FIG. 5 illustrates a schematic diagram of a process 500 for migrating data in parallel according to embodiments of the present disclosure. At 505, a concurrent job controller determines a parallel number of the migration jobs, and the parallel number represents the number of migration jobs that are executed in parallel, for example, three migration jobs may be executed in parallel. Generally, the increase of the parallel number can improve migration speed, but it also increases resource consumption of the processor and the memory of the backup system. Thus, the migration parallel number should be comprehensively determined according to the hardware information of the migration platform and the backup data pattern. An example implementation for determining a parallel number is described below with reference to FIG. 8.

At 508, the whole migration job is initiated when the backup system is upgrading from the old system to a new system. Next, the whole migration job may be split into a plurality of sub jobs for parallel migration. At 511-513, a first migration job for the first client is initiated and a first cache file is set for the first client, and then the first job is executed. At 521-523, a second migration job for the second client is initiated and a second cache file is set for the second client, and then the second job is executed. At 531-533, a third migration job for the third client is initiated and a third cache file is set for the third client, and then the third job is executed. Because the three migration jobs are executed in parallel, the efficiency of data migration can be improved. Further, if a certain migration job fails, other migration jobs can continue to proceed, thereby ensuring fault tolerance of the backup system. At 550, when all of the sub migration jobs are finished, the whole migration job is completed. It should be understood that although FIG. 5 illustrates three parallel jobs, fewer or a greater number of three parallel jobs are also possible.

Optionally, a unique job identification (ID) may be set for each migration job at 560, and the progress monitor monitors each migration job (such as monitoring progress information of each job) at 565. For example, a first identification may be set for the first migration job, a second identification may be set for the second migration job, and a third identification may be set for the third migration job. In some embodiments, progress may be calculated based on the total data amount and the amount of data that is already transmitted, and the progress information and the job identifications may be transmitted to the progress monitor. In some embodiments, when the backup system detects a fault, the progress monitor may rapidly locate, based on the fault information and the job identification therein, the failed migration job at 575. In some embodiments, a User Interface (UI) may be configured to visually display the progress information of each migration job.

Monitoring the execution of each migration job has the advantages in at least the following two aspects. First, when the whole migration job is still running, the user may be aware about whether there is a client that has finished its own migration job and may be available on the target server. In such case, the whole migration job is displayed as running due to presence of other unfinished migration job(s). The awareness of client that has been migrated will facilitate the users to start using the target server for the clients at an earlier time. Second, monitoring also contributes to problem solving. When a fault occurs, the failed client may be easily identified from the progress information as the fault information is displayed in a corresponding progress item for the client.

Figure 6:
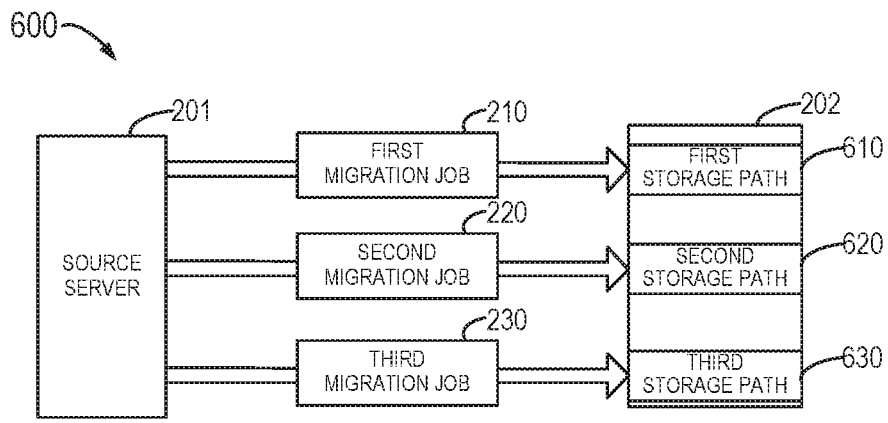
FIG. 6 illustrates a schematic diagram for migrating data to different storage paths according to embodiments of the present disclosure.

FIG. 6 illustrates a schematic diagram 600 for migrating data to different storage paths according to embodiments of the present disclosure. As shown in FIG. 6, a respective storage path may be configured for each migration job in the target server 202. For example, a first storage path 610 is configured for the first migration job 210, a second storage path 620 is configured for the second migration job 220, and a third storage path 630 is configured for the third migration job 230. These storage paths differ from one another. In this way, interaction effect between different migration jobs can be avoided, so as to obtain better write performance. For example, each storage path may be a unique path to which the data is written.

Figure 7:
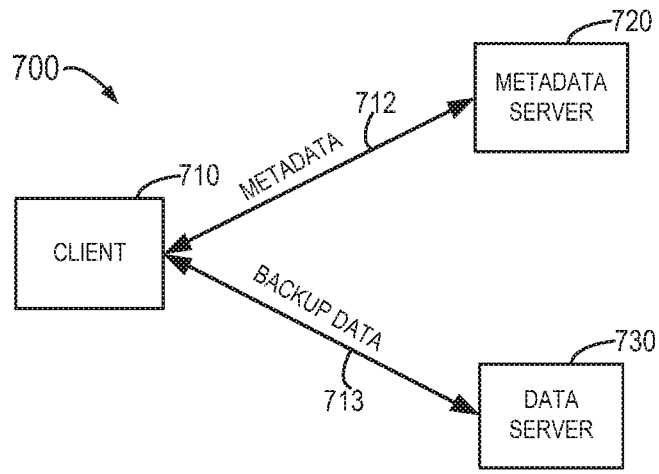
FIG. 7 illustrates a block diagram of architecture of a data backup system according to embodiments of the present disclosure.

FIG. 7 illustrates a block diagram of architecture of a data backup system 700 according to embodiments of the present disclosure. As shown in FIG. 7, the backup system 700 includes a client 710, a metadata server 720 and a data server 730. It should be understood that the metadata server may be omitted in some embodiments. Further, although FIG. 7 only illustrates one client, the backup system 700 may have a plurality of clients. As indicated by arrow 712, the client 710, when performing data backup, stores the metadata in the metadata server 720, and the client 710 stores the backup data per se in the data server 730 as indicated by the arrow 713. The data server 730 may be expanded for local recovery and distributed recovery and has a compression algorithm, whose high-level data deduplication architecture can realize high speed and high flexibility.

Figure 8:
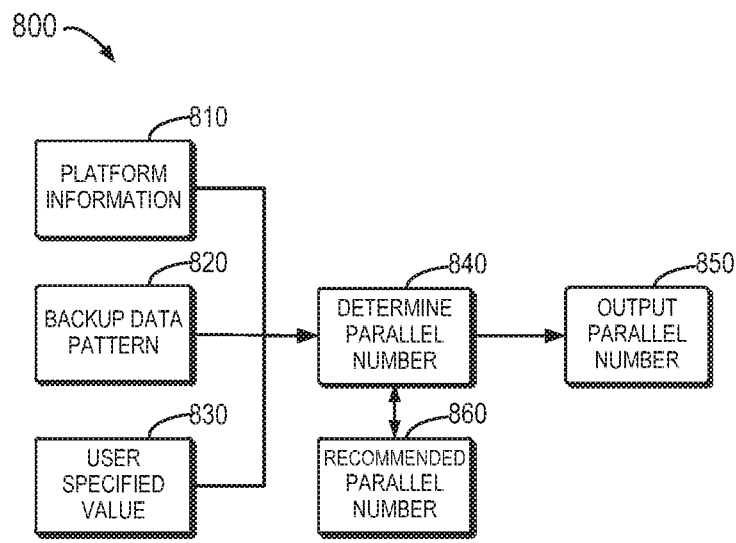
FIG. 8 illustrates a schematic diagram for determining a parallel number of migration jobs according to embodiments of the present disclosure.

FIG. 8 illustrates a schematic diagram of a process 800 for determining a parallel number of migration jobs according to embodiments of the present disclosure. Generally, more migration jobs will improve the whole migration speed, but it will consume more resources of the processor and the memory. If the parallel number is too small or too big, the optimal performance cannot be obtained. Therefore, the parallel number needs to be determined based on various factors. In some embodiments, if the user has specified the parallel number, the value specified by the user may be preferably chosen. If the user does not specify, the parallel number may be determined based on the hardware information and the backup data pattern.

As shown in FIG. 8, at 840, the parallel number of the migration jobs is determined by looking up a recommended parallel number table 860 based on the hardware information 810 of the migration platform and the backup data pattern 820 (for example, the file size is 1 KB, 128 KB or 32 MB and the like). The table 860 records, for example, experimental data of each parallel number from platform experiments, so the parallel number may be determined based on the table at 840. It should be understood if the user has specified the parallel number, the parallel number of the migration job may be determined based on the value 830 specified by the user. The determined parallel number may be outputted at 850.

It should be appreciated that different hardware platforms have various processor types and memory sizes, so the recommended parallel number also varies for different hardware platforms. In one embodiment, as the parallel number or file size grows, the utilization rate of the processor increases, but the utilization rate of the memory does significantly change. In addition, as the parallel number or file size grows, the whole migration speed of the backup system also accelerates. Further, in various embodiments, the performance of the backup system stops increasing and might even drop when the parallel number reaches a certain threshold.

In some embodiments, the parallel number of the migration jobs may be determined based on the results for testing different file sizes and different parallel numbers on the migration platform, wherein the test results include usage of the processor, usage of the memory and rate of data migration. For example, in the Gen4S backup system, assume that 80% data is of 32 MB, 15% data is of 128 KB and 5% data is of 1 KB for all data to be migrated, 5 can be selected as the recommended parallel number because it is expected that the 32 MB data, which is the majority, moves faster. Besides, if the user does not expect the migration job to take up too many resources so as to facilitate other jobs to run faster, a smaller parallel number may also be selected. Thus, for a particular backup system, an optimal value of the parallel number may be obtained based on the experimental data. In this way, a method for automatically determining the parallel number may be provided, such that the user can efficiently employ the hardware system of the migration platform.

Figure 9:
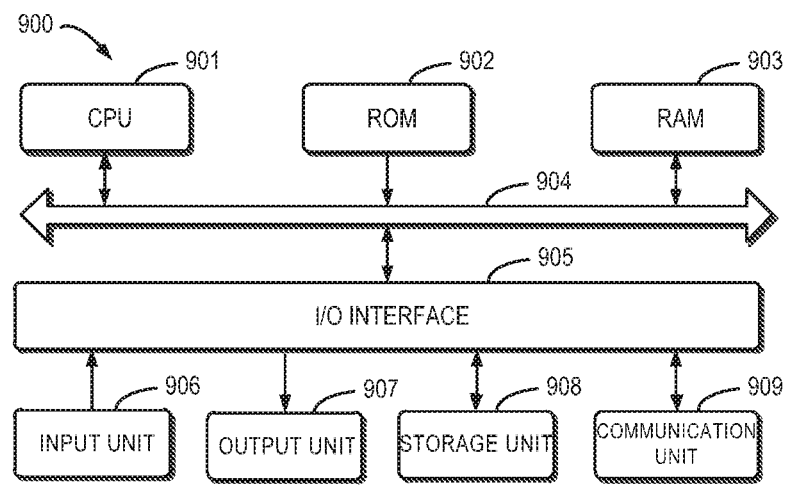
FIG. 9 illustrates a schematic block diagram of a device for implementing embodiments of the present disclosure.

FIG. 9 illustrates a schematic block diagram of an example device 900 for implementing embodiments of the present disclosure. As shown, the device 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of display and loudspeakers etc.; a storage unit 908, such as disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described method or process may also be executed by the processing unit 901. For example, in some embodiments, the method may be implemented as a computer software program tangibly included in the machine-readable medium, e.g., storage unit 908. In some embodiments, the computer program can be partially or fully loaded and/or mounted to the device 900 via ROM 902 and/or communication unit 909. When the computer program is loaded to RAM 903 and executed by the CPU 901, one or more steps or actions of the above described method or procedure may be implemented.

In some embodiments, the above described method and process may be implemented as computer program product. The computer program product may include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, and traditional procedural programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program may also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

We claim:

1. A method for migrating data, comprising:
    initiating a first migration job for a first client and a second migration job for a second client; and
    in response to the initiating, executing the first migration job and the second migration job in parallel, the execution of the first migration job using a first cache file and the execution of the second migration job using a second cache file,
        wherein the first cache file is associated with the first client and the second cache file is associated with the second client, and
        wherein executing the first migration job and the second migration job comprises:
            determining a parallel number of migration jobs using a table, the parallel number indicating a number of migration jobs to be executed in parallel, the table contents based on hardware information, file size, and results of testing different file sizes and different parallel numbers on a migration platform; and
            initiating a plurality of migration jobs corresponding to the parallel number, the plurality of migration jobs comprising the first migration job and the second migration job;
    setting a first identification for the first migration job;
    setting a second identification for the second migration job; and
    monitoring the first migration job and the second migration job using the first identification and the second identification, respectively, during parallel execution of the first migration job and the second migration job,
        wherein monitoring the first migration job and the second migration job comprises acquiring current progress information of the first migration job and the second migration job.

2. The method of claim 1, wherein the executing the first migration job and the second migration job in parallel comprises:
    in response to a first hash value of a first file being present in the first cache file, discarding a migration of the first file; and
    in response to a second hash value of a second file being absent in the first cache file, executing a migration of the second file.

3. The method of claim 1, wherein,
    in response to detecting a fault, determining, based on the current progress information, a migration job associated with the fault, wherein the migration job is one selected from the group consisting of the first migration job and the second migration job.

4. The method of claim 1, wherein the first migration job and the second migration job are used for migrating data from a source server to a target server, and the method further comprises:
    setting, in the target server, a first storage path for the first client and a second storage path for the second client, the first storage path being different from the second storage path.

5. The method of claim 1, wherein the results of the testing including usage of a processor, usage of a memory and a rate of data migration.

6. A device for migrating data, comprising:
    a processing unit; and
    a memory coupled to the processing unit and stored with instructions, the instructions, when executed by the processing unit, performing a method, the method comprising:
        initiating a first migration job for a first client and a second migration job for a second client; and
        executing the first migration job and the second migration job in parallel, the execution of the first migration job using a first cache file and the execution of the second migration job using a second cache file,
            wherein the first cache file is associated with the first client and the second cache file is associated with the second client, and
            wherein executing the first migration job and the second migration job comprises:
                determining a parallel number of migration jobs using a table, the parallel number indicating a number of migration jobs to be executed in parallel, the table contents based on hardware information, a file size, and results of testing different file sizes and different parallel numbers on a migration platform; and
                initiating a plurality of migration jobs corresponding to the parallel number, the plurality of migration jobs comprising the first migration job and the second migration job;
        setting a first identification for the first migration job;
        setting a second identification for the second migration job; and
        monitoring the first migration job and the second migration job using the first identification and the second identification, respectively, during parallel execution of the first migration job and the second migration job,
            wherein monitoring the first migration job and the second migration job comprises acquiring current progress information of the first migration job and the second migration job.

7. The device of claim 6, wherein executing the first migration job and the second migration job in parallel comprises:
    in response to a first hash value of a first file being present in the first cache file, discarding a migration of the first file; and
    in response to a second hash value of a second file being absent in the first cache file, executing a migration of the second file.

8. The device of claim 6, wherein,
in response to detecting a fault, determining, based on the current progress information, a migration job associated with the fault, wherein the migration job is one selected from a group consisting of the first migration job and the second migration job.

9. The device of claim 6, wherein the first migration job and the second migration job are used for migrating data from a source server to a target server, and the method further comprises:
setting, in the target server, a first storage path for the first client and a second storage path for the second client, the first storage path being different from the second storage path.

10. The device of claim 6, wherein the results of the testing including usage of a processor, usage of a memory and a rate of data migration.

11. A computer program product tangibly stored on a non-transient computer-readable medium and including computer-executable instructions, the computer-executable instructions, when executed, causing a computer to perform a method, the method comprising:
initiating a first migration job for a first client and a second migration job for a second client; and
in response to the initiating, executing the first migration job and the second migration job in parallel, the execution of the first migration job using a first cache file and the execution of the second migration job using a second cache file,
wherein the first cache file is associated with the first client and the second cache file is associated with the second client, and
wherein executing the first migration job and the second migration job comprises:
determining a parallel number of migration jobs using a table, the parallel number indicating a number of migration jobs to be executed in parallel, the table contents based on hardware information, a file size, and results of testing different file sizes and different parallel numbers on a migration platform; and
initiating a plurality of migration jobs corresponding to the parallel number, the plurality of migration jobs comprising the first migration job and the second migration job;
setting a first identification for the first migration job;
setting a second identification for the second migration job; and
monitoring the first migration job and the second migration job using the first identification and the second identification, respectively, during parallel execution of the first migration job and the second migration job,
wherein monitoring the first migration job and the second migration job comprises acquiring current progress information of the first migration job and the second migration job.

12. The computer program product according to claim 11, wherein executing the first migration job and the second migration job in parallel comprises:
in response to a first hash value of a first file being present in the first cache file, discarding a migration of the first file; and
in response to a second hash value of a second file being absent in the first cache file, executing a migration of the second file.

13. The computer program product according to claim 11, wherein,
in response to detecting a fault, determining, based on the current progress information, a migration job associated with the fault, wherein the migration job is one selected from the group consisting of the first migration job and the second migration job.

14. The computer program product according to claim 11, wherein the first migration job and the second migration job are used for migrating data from a source server to a target server, and the method further comprises:
setting, in the target server, a first storage path for the first client and a second storage path for the second client, the first storage path being different from the second storage path.

15. The computer program product according to claim 11, wherein the results of the testing including usage of a processor, usage of a memory and a rate of data migration.

* * * * *